US007341124B2

(12) United States Patent
Yanaka

(10) Patent No.: US 7,341,124 B2
(45) Date of Patent: Mar. 11, 2008

(54) DRIVING OPERATION DEVICE

(75) Inventor: Akihiro Yanaka, Toyota (JP)

(73) Assignee: Toyota Jidosha Kabushiki Kaisha, Tokyo (JP)

( * ) Notice: Subject to any disclaimer, the term of this patent is extended or adjusted under 35 U.S.C. 154(b) by 628 days.

(21) Appl. No.: 10/347,355

(22) Filed: Jan. 21, 2003

(65) Prior Publication Data

US 2003/0141133 A1 Jul. 31, 2003

(30) Foreign Application Priority Data

Jan. 28, 2002 (JP) ............................ 2002-018739

(51) Int. Cl.
*B60K 26/00* (2006.01)

(52) U.S. Cl. ...................... 180/315; 180/333; 180/336; 74/471 R; 74/471 XY

(58) Field of Classification Search ............... 180/6.32, 180/315, 333, 336; 74/471 R, 471 XY, 491, 74/492, 495; 477/209
See application file for complete search history.

(56) References Cited

U.S. PATENT DOCUMENTS 3,888,083 A * 6/1975 Tone ........................... 60/431
5,726,890 A * 3/1998 Takamoto et al. ............ 701/70
5,809,841 A * 9/1998 Smith .......................... 74/531
5,979,268 A * 11/1999 Freberg et al. ............... 74/531
6,095,268 A * 8/2000 Jones, Jr. ..................... 180/6.5
6,095,944 A * 8/2000 Buchanan et al. ............ 477/94
6,260,641 B1 * 7/2001 Hidaka ....................... 180/6.44
6,704,001 B1 * 3/2004 Schena et al. .............. 345/161
6,808,032 B2 * 10/2004 Wuertz et al. ............. 180/6.48
6,948,582 B2 * 9/2005 Shiomi et al. .............. 180/315
2002/0005302 A1 * 1/2002 Hidaka ....................... 180/6.24
2004/0002405 A1 * 1/2004 Laukkanen ................. 477/209

FOREIGN PATENT DOCUMENTS

| | | |
|---|---|---|
| DE | PS 1 253 598 | 11/1967 |
| DE | 33 18 026 A1 | 11/1984 |
| JP | A-8-115140 | 5/1996 |
| JP | A-9-301193 | 11/1997 |
| JP | A-10-232725 | 9/1998 |
| JP | A 11-192960 | 7/1999 |
| JP | A-2000-66753 | 3/2000 |

* cited by examiner

*Primary Examiner*—Toan To
(74) *Attorney, Agent, or Firm*—Oliff & Berridge, PLC

(57) ABSTRACT

A driving operation device includes an input portion which inputs an amount of operation by the driver, an output portion to which the amount of operation is transmitted and a form modifying portion which modifies an orientation of the input portion based on an output of the output portion corresponding to the amount of operation. This can maintain the input portion vertical or horizontal, for example.

12 Claims, 7 Drawing Sheets

DRIVING OPERATION DEVICE

INCORPORATION BY REFERENCE

The disclosure of Japanese Patent Application No. 2002-018739 filed on Jan. 28, 2002 including the specification, drawings and abstract is incorporated herein by reference in its entirety.

BACKGROUND OF THE INVENTION

1. Field of Invention

The invention relates to a driving operation device which includes an operation member operated by a driver, and operates driving of a vehicle in accordance with the driver's operation of the operation member.

2. Description of Related Art

As a related art of the invention, for example, as disclosed in Japanese Patent Laid-Open Publication No. 11-192960, a driving operation device including an operation member with enhanced operation stability, has been developed. In the driving operation device, a joystick is used as the operation member. When the driver operates the joystick in a direction moving it away from the driver's body, an amount of movement or an operating force on the joystick by the driver's hand is smaller than when the driver operates the joystick toward the driver's body. Therefore, the operation of the joystick conforms with a structural feature of an upper limb of a human body, which results in enhancement of operability.

However, in the driving operation device, although an amount of movement or the like of the joystick by the hand at the time of operating the joystick toward the driver's body is different from that at the time of operating the joystick in the direction of moving it away from the driver's body, a relation between an amount of operation (input) of the joystick and an output to the vehicle (such as acceleration or deceleration or the like) is fixed. Therefore, there exists a problem that a vehicle operation in various input forms cannot be executed.

SUMMARY OF THE INVENTION

In order to address the above-mentioned problem, it is one object of the invention to provide a driving operation device in which the result output for an amount of operation of an input portion, or an orientation of the input portion, can be changed.

In order to attain the above and/or other objects, one aspect of the invention provides a driving operation device that executes a driving operation of a vehicle by a driver comprising an input portion which inputs an amount of operation by the driver, an output portion to which the amount of operation is transmitted and a form modifying portion which modifies an orientation of the input portion based on an output of the output portion corresponding to the amount of operation.

In addition, the driving operation device according to another aspect of the invention executes the driving operation of the vehicle by the driver, and includes a first input portion in which the driver inputs a first amount of operation, a second input portion in which the driver inputs a second amount of operation and an output portion which outputs a third output value which is determined according to a first output value based on the first amount of operation and a second output value based on the second amount of operation.

BRIEF DESCRIPTION OF THE DRAWINGS

The invention will be described with reference to exemplary embodiments illustrated in the drawings, in which.

DETAILED DESCRIPTION OF EXEMPLARY EMBODIMENTS

Figure 1:
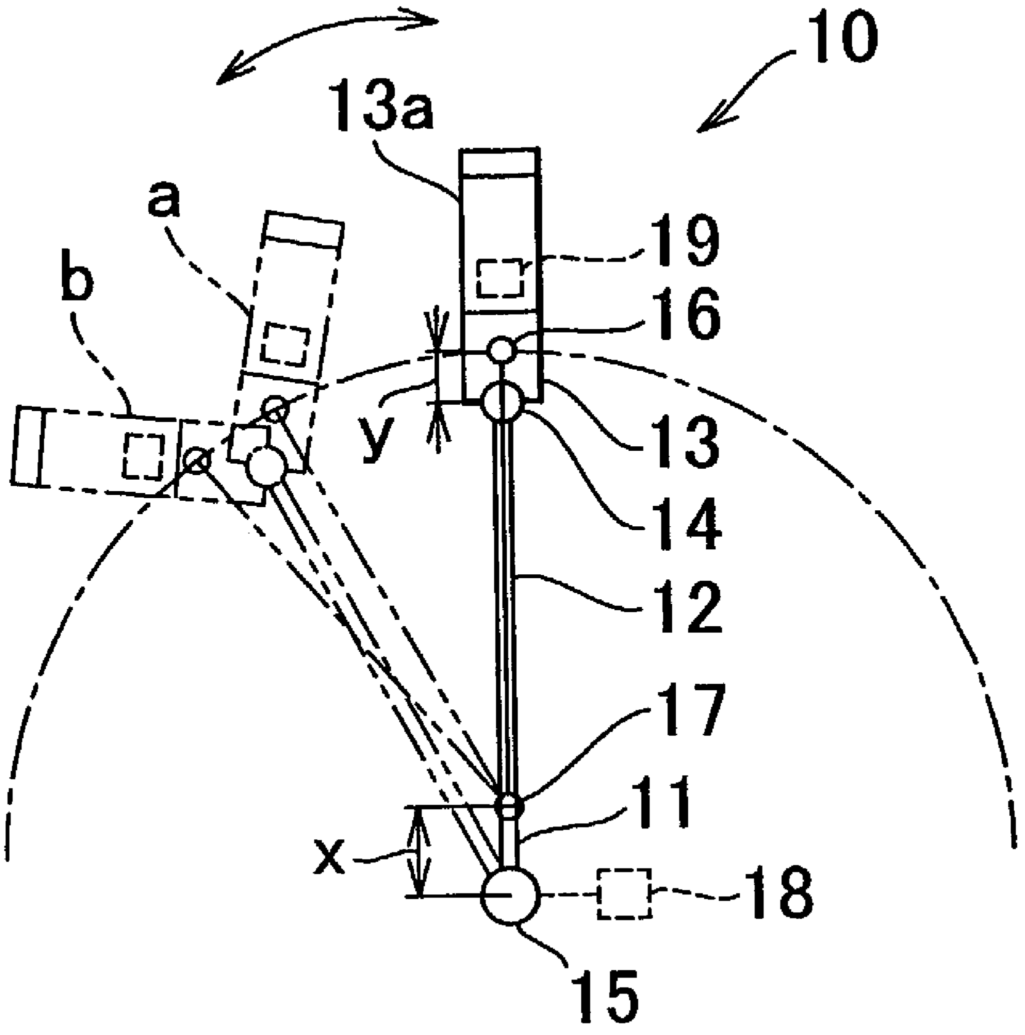
FIG. 1 is a schematic front view showing an operating lever of a driving operation device according to a first embodiment.

Hereafter, embodiments of a driving operation device according to the invention will be explained with reference to the accompanying drawings.

A driving operation device according to a first embodiment includes an operating lever (joystick) 10 as an operation member. The operating lever 10 is provided in the vicinity of a driver's seat of a vehicle, and the whole lever is tilted (rotated) in a lateral direction with respect to the vehicle by the driver's operation, as shown by an arrow in FIG. 1. The operating lever 10 includes a main link 11 in a shape of a rod with a large diameter, a control link 12 in a shape of a rod with a small diameter, and a holding portion 13 in a cylindrical shape.

An upper end portion of the main link 11 is rotatably coupled with the holding portion 13 through a main rotational shaft 14 provided in a lower end portion of the holding portion 13. A lower end portion of the main link 11 is fixed to a central rotational shaft 15 rotatably fixed to a vehicle body side. Therefore, the main link 11 rotates along with the central rotational shaft 15 about a rotation axis corresponding to the axis of the central rotational shaft 15. An upper end portion of the control link 12, whose length is set to be shorter than that of the main link 11, is rotatably coupled with the holding portion 13 through a control rotational shaft 16 provided above the main rotational shaft 14 in the holding portion 13. A lower end of the control link 12 is fixed to an adjusting rotational shaft 17 that is rotatably mounted above the central rotational shaft 15 on a vehicle side. Therefore, the control link 12 rotates along with the adjusting rotational shaft 17 about a rotation axis corresponding to the axis of the adjusting rotational shaft 17.

The main link 11, the control link 12, and/or the like form a link mechanism of the operating lever 10. When the link mechanism operates the operating lever 10 in the lateral direction, the holding portion 13 can change its direction of tilting. Also, the link mechanism can set the direction of tilting (i.e., the orientation) of the holding portion 13, to either a substantially upright (vertical) state or a substantially level (horizontal) state by switching a switch (not shown). More specifically, when the operating lever 10 is at a neutral position, the holding portion 13 is in a neutral state where the holding portion 13 can tilt in any one of the directions, and when the holding portion 13 is prohibited from tilting in one of the directions, the holding portion may be tilted in the other direction.

Also, an operation position sensor 18 is provided in the vicinity of the central rotational shaft 15. The operation position sensor 18 is fixed to the vehicle body side at an end portion of the central rotational shaft 15, and detects a rotation angle of the central rotational shaft 15 as a displacement position of the operating lever 10 in the lateral direction. A value of the displacement position detected by the operation position sensor 18 is adjusted to be "0" when the operating lever is at the neutral position in the lateral direction. Note that a reaction force generating mechanism (not shown) including an electric motor can be coupled with the central rotational shaft 15. The reaction force generating mechanism generates a reaction force which returns the operating lever 10 to the neutral position in accordance with the displacement position of the operating lever 10 detected by the operation position sensor 18.

The holding portion 13 is part of a rotational operation portion 13*a* whose upper peripheral portion is rotatable about a shaft. (Referring to the solid lines in FIG. 1, the shaft extends vertically, i.e., along the longitudinal axis of the portion 13*a*.) In addition, a spring body (not shown) and an operation position sensor 19 are provided therein. The rotational operation portion 13*a* is set to return to an initial position (neutral position) by the spring body, and stops at the neutral position when a turning force is not applied (by the vehicle operator). Also, the operation position sensor 19 detects a rotation angle of the rotational operation portion 13*a* as a displacement position of the rotational operation portion 13*a* in a rotational direction. A value of the displacement position, which is an output of the operation position sensor 19, is adjusted to be "0" when the rotational operation portion 13*a* is at the neutral position.

An input portion according to this aspect of the invention is composed of the holding portion 13, and the output portion is composed of the central rotational shaft 15. The link mechanism of the operating lever 10 is composed of the main link 11, the control link 12, the main rotational shaft 14, the control rotational shaft 16 and the adjusting rotational shaft 17. A quadric link mechanism in which the lengths of the main link 11 and the control link 12 are different is composed by coupling the holding portion 13 and the central rotational shaft 15 with the link mechanism.

An electric control portion of the driving operation device will be explained with reference to FIG. 2. In an electric control portion 20, the operation position sensors 18, 19 are connected to an electric control device 21. The electric control device 21 is composed of a microcomputer including a CPU 21*a*, a ROM 21*b*, a RAM 21*c* or the like. The device 21 controls a steering control device 22 in accordance with a value detected by the operation position sensor 18, and controls an engine control device 23 and a brake control device 24 in accordance with a value detected by the operation position sensor 19. Also, the CPU 21*a* calculates data which is transmitted to the steering control device 22 or the like based on the values detected by the operation position sensors 18, 19 and executes various programs input into the ROM 21*b*.

The steering control device 22 controls a steering actuator 25 in accordance with the driver's operation of the operating lever 10 in the lateral direction, and steers the vehicle in the lateral direction. More specifically, the electric control device 21 inputs a displacement position of the operating lever 10 in the lateral direction transmitted from the operation position sensor 18 into the steering control device 22, and the steering control device 22 steers the vehicle in the lateral direction in accordance with a steering angle corresponding to the displacement position which is input. The steering angle is set to be "0" when the displacement position of the operating lever 10 is at the neutral position.

The engine control device 23 is controlled by the electric control device 21 based on a displacement position of the rotational operation portion 13*a* detected by the operation position sensor 19, and executes an acceleration control of the vehicle by driving a throttle actuator 26 for controlling a throttle opening amount. The rotational operation portion 13*a* is set in a rotational direction about the shaft to increase an acceleration of the vehicle in accordance with a displacement in the counterclockwise direction with respect to the neutral position, decrease the acceleration of the vehicle with a displacement toward the neutral position, and make the acceleration "0" at the neutral position.

The brake control device 24 is controlled by the electric control device 21 based on a displacement position of the rotational operation portion 13*a* detected by the operation position sensor 19, and drives a brake actuator 27 which supplies a braking force to the vehicle. The rotational operation portion 13*a* is set to increase a braking force of the vehicle with a displacement in a clockwise direction with respect to the neutral position, decrease the braking force of the vehicle with a displacement toward the neutral position, and make the braking force "0" at the neutral position.

In this structure, when the driver operates the vehicle, an ignition switch is turned ON to enable actuation of the vehicle. Then, when the driver rotates (twists) the rotational operation portion 13*a* to make the rotational operation portion 13*a* displace in the counterclockwise direction with respect to the neutral position, the operation position sensor 19 detects the displacement position. A signal corresponding to the displacement position of the rotational operation portion 13*a* is supplied to the electric control device 21, and the electric control device 21 outputs a control signal for opening the throttle to the engine control device 23. Then, the engine control device 23 controls the throttle actuator 26, which allows the vehicle to start forward running in accordance with the displacement position of the rotational operating portion 13*a*.

When the driver operates the operating lever 10 such that the operating lever 10 is displaced laterally to the right side of the vehicle with respect to the neutral position in the lateral direction of the vehicle, the operation position sensor 18 detects a displacement position thereof. A signal corresponding to the displacement position of the operating lever 10 is supplied to the electric control device 21, the electric control device 21 outputs a steering control signal to the steering control device 22, and the steering control device 22 controls the steering actuator 25 in accordance with the steering control signal. As a result, a steering angle increases rightward, and the vehicle turns right. Also, when the operating lever 10 is displaced to the left side of the vehicle with respect to the neutral position, the steering angle increases leftward, and the vehicle turns left (such a position is shown by the broken lines in FIG. 1).

In this case, when the switch is actuated to set a tilt direction of the holding portion 13, which is generated by operating the operating lever 10, to be maintained at a substantially upright (vertical) state, and the operating lever 10 is operated leftward with respect to the vehicle, the operating lever 10 comes into a state shown by a dashed line a in FIG. 1. Namely, the operating lever 10 proceeds in a manner such that the upper end portion of the holding portion 13 is tilted toward the neutral position. The tilt angle increases with increases in an amount of displacement of the operating lever 10; however, the holding portion 13 is tilted in a direction that suppresses (reduces) an amount of displacement of the holding portion 13 for a given displacement of the rotational shaft 15 (this will be described in more detail below). Conversely, when the operating lever 10 is operated rightward with respect to the vehicle, the holding portion 13 is tilted in a reverse direction, and the upper end of the holding portion 13 tilts toward the neutral position.

When the operating lever 10 is returned to the neutral position, the switch can be actuated to set a tilt direction so that the holding portion 13 is maintained in a substantially level (horizontal) state. The operating lever 10 comes into a state shown by a dashed line b in FIG. 1. Namely, the operating lever 10 moves while sharply tilting the upper end side of the holding portion 13 leftward. The tilt angle increases with increases in an amount of displacement of the operating lever 10; however, the holding portion 13 is tilted in a direction that increases an amount of displacement of the holding portion 13 for a given displacement of the rotational shaft 15 (this will be described in more detail below). Conversely, when the operating lever 10 is operated rightward with respect to the vehicle, the upper end side of the holding portion 13 is sharply tilted rightward.

The meaning of reducing or increasing an amount of displacement of the holding portion 13 for a given displacement of the rotational shaft 15 will now be described. The holding portion 13 orientations a and b shown in FIG. 1 result in the same amount of displacement (rotation) of the shaft 15. This is because the position of the main rotational shaft 14, and therefore the position of the main link 11, is the same for both orientations a and b. However, as can be appreciated by comparing the positions of holding portion 13, control rotational shaft 16, and control link 12 for each of the orientations a and b, elements 13, 12, 16 have been displaced (from the FIG. 1 solid line neutral position) by a greater amount when in orientation b compared to orientation a. Thus, orientation a requires less displacement of holding portion 13 than orientation b to achieve the same displacement amount of the rotational shaft 15.

When the rotational operation portion 13*a* is rotated (twisted) in a clockwise direction with respect to the neutral position in the rotation direction by the driver's operation, the operation position sensor 19 detects the position, a signal corresponding to the position is transmitted to the electric control device 21, and the electrical device 21 calculates a value of the braking force corresponding to the position by a computing process and outputs the control signal to the brake control device 24. Then, the brake control device 24 controls the brake actuator 27, which makes the vehicle brake in accordance with the position of the rotational operation portion 13*a*. When the rotational operation portion 13*a* is rotated in the counterclockwise direction again, the vehicle accelerates.

In this manner, in the driving operation device according to the embodiment, when the operating lever 10 is operated in the upright (vertical) direction with the tilt direction of the holding portion 13 set to be in the direction so as to suppress an amount of displacement of the holding portion 13, the ratio of an amount of displacement of the holding portion 13 to an amount of displacement of the main link 11 or the control link 12 decreases with increases in an amount of displacement of the main link 11 or the like. In this case, an amount of a movement of the driver's hand decreases, which alleviates a load of operation. Also, while an acceleration operation or a braking operation is executed, the holding portion 13 maintains a state close to an upright state at all times even if the operating lever 10 is tilting in the lateral direction due to a performance of a steering operation. Therefore, the driver's hand faces in the same direction at all times as well, which prevents the driver from twisting his or her hand. This results in an easy steering operation as well as easy acceleration and braking operations.

When the operating lever 10 is operated in the lateral (horizontal) direction with the tilt direction of the holding portion 13 set to be in a direction of increasing an amount of displacement of the holding portion 13, a ratio of an amount of displacement of the holding portion 13 to an amount of displacement of the main link 11 or the control link 12 drastically increases with increases in an amount of displacement of the main link or the like. In this case, an amount of displacement of the holding portion 13 corresponding to a value detected by the operation position sensor 18 increases, which enables an accurate control of an amount of displacement of the central rotational shaft 15, and a vehicle operation by a micro input.

The tilt angle of the holding portion 13 is determined depending on a relation between a distance x between a central point of the central rotational shaft 15 and a central point of the adjusting rotational shaft 17, and a distance y between a central point of the main rotational shaft 14 and a central point of the control rotational shaft 16. Namely, a tilt angle of the holding portion 13 at the time of operating an operating lever 10 in the lateral direction increases with increases in a difference between the distance x and the distance y, and a tilt angle of the holding portion 13 at the time of operating the operating lever 10 in the lateral direction decreases with decreases in the difference between the distance x and the distance y. Therefore, the tilt angle of the holding portion 13 at the time of operating the operating lever 10 can be at an arbitrary angle by setting a difference between the distance x and the distance y as appropriate.

In the embodiment, when the operating lever 10 is operated in the lateral direction, the vehicle is steered in the lateral direction, when the rotational operation portion 13*a* is turned in the counterclockwise direction, the vehicle accelerates, and when the rotational operation portion 13*a* is turned in the clockwise direction, the vehicle is braked. However, the structure can be modified. For example, in a rotational operation of the rotational operation portion 13*a*, only an acceleration control of the vehicle may be executed, and the braking control may be executed by operating another operation member. Alternatively, only the braking control of the vehicle may be executed in the rotational operation of the rotational operation member 13*a*, and the acceleration control may be executed by operating another operation member. Further, the acceleration and braking controls may be executed by operating the operating lever 10 in the lateral direction, and the steering control may be executed by executing the rotational operation of the rotational operation portion 13*a*. In addition, the direction of controlling the operating lever 10 may be in a longitudinal direction (of the vehicle, i.e., forward and backward) instead of the lateral direction.

Figure 3:
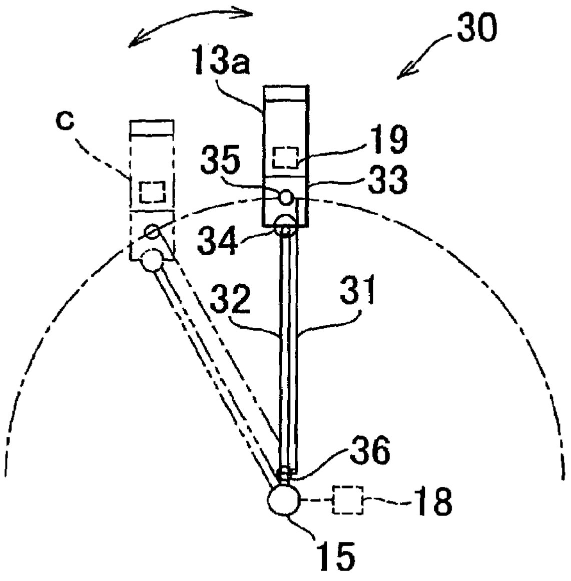
FIG. 3 is a schematic front view showing the operating lever of the driving operation device according to a second embodiment.

FIG. 3 shows an operating lever 30 provided in a driving operation device according to a second embodiment of the invention. In the operating lever 30, a control link 31 in a shape of a rod with a small diameter is formed in a substantially U-shape. The length of the control link 31 extending in a vertical direction is set at the same length as a main link 32. An end of a portion extending sideward from the upper end side of the control link 31 is rotatably coupled with a holding portion 33 through a control rotational shaft 35 provided above a main rotational shaft 34 in the holding portion 33. An end of a portion extending sideward from the lower end side of the control link 31 is fixed to an adjusting rotational shaft 36 which is rotatably mounted on the vehicle body side.

Therefore, the control link 31 rotates along with the adjusting rotational shaft 36 about the axis of the adjusting rotational shaft 36. Note that a mounting position of the adjusting rotational shaft 36 is set at a lower position than a mounting position of an adjusting rotational shaft 17 in an operating lever 10 according to the first embodiment by an amount equal to the increased length of the control link 31. Also, in the case of the operating lever 30, a link mechanism of the operating lever 30 is composed of the main link 32, the control link 31, the main rotational shaft 34, the control rotational shaft 35, and the adjusting rotational shaft 36. A parallel link mechanism in which the main link 32 and the control link 31 are maintained in a parallel state at all times is composed by coupling the holding portion 33 and a central rotational shaft 15 with the link mechanism. Structures of the other portions in the driving operation device including the operating lever 30 are the same as those in the driving operation device including the operating lever 10 according to the first embodiment. Therefore, the same symbols are assigned to the same portions in the drawing.

Due to the above-mentioned construction, when the operating lever 30 is moved from a position shown by solid lines in the diagram to a position shown by dashed lines c by operating the holding portion 33, the main link 32 and the control link 31 move with their parallel state maintained. Therefore, a line connecting the central point of the main rotational shaft 34 with the central point of the control rotational shaft 35, and a line connecting the central rotational shaft 15 with the central point of the adjusting rotational shaft 36 are maintained in a parallel state as well, and the holding portion 33 is maintained in an upright state. Also, in the same manner, the holding portion 33 is maintained in the upright state even when the operating lever 30 is moved to the right side in the drawing.

As aforementioned, in the driving operation device according to the second embodiment, the holding portion 33 is upright at all times even when an amount of displacement of the operating lever 30 with respect to the neutral position increases. Therefore, an amount of displacement of the holding portion 33 with respect to a main body portion including the main link 32 or the like is small. Accordingly, an amount of a movement of the driver's hand is reduced, which alleviates a load of operation. Also, while an acceleration operation or a braking operation is executed, the holding portion 33 is maintained in the upright state at all times even when the operating lever 30 is tilting in a lateral direction by a steering operation. Therefore, the driver's hand faces in the same direction at all times as well, which prevents the driver from twisting his or her hand. This facilitates a steering operation as well as acceleration and braking operations.

The control link 12 of the operating lever 10 according to the first embodiment also may be formed in a substantially U-shape such as the control link 31 of the operating lever 30. In this case, a tilting state of the holding portion 13 is a left-right asymmetry with respect to the neutral position, which enables operations in a different form.

Figure 4:
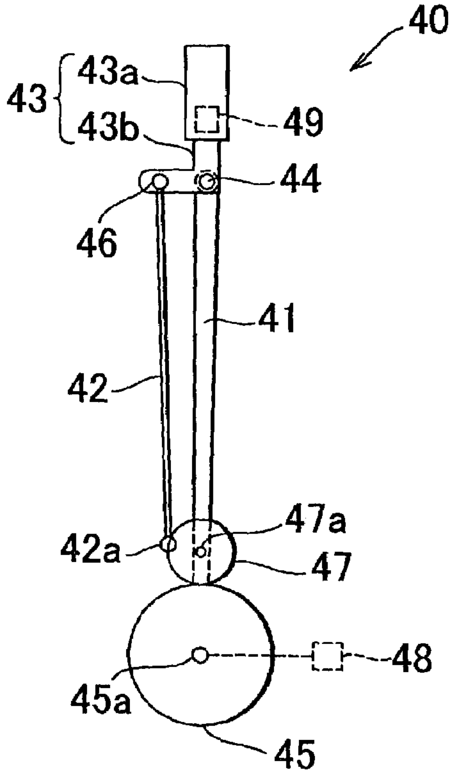
FIG. 4 is a schematic front view showing the operating lever of the driving operation device according to a third embodiment.
Figure 5:
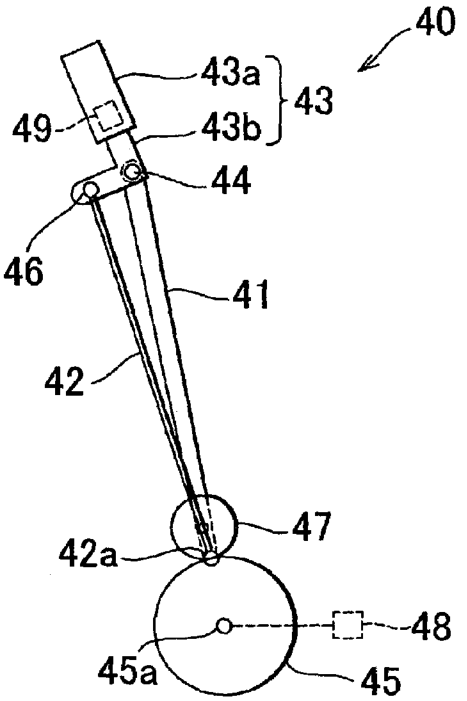
FIG. 5 is a schematic front view showing a state where the operating lever shown in FIG. 4 is tilted.
Figure 6:
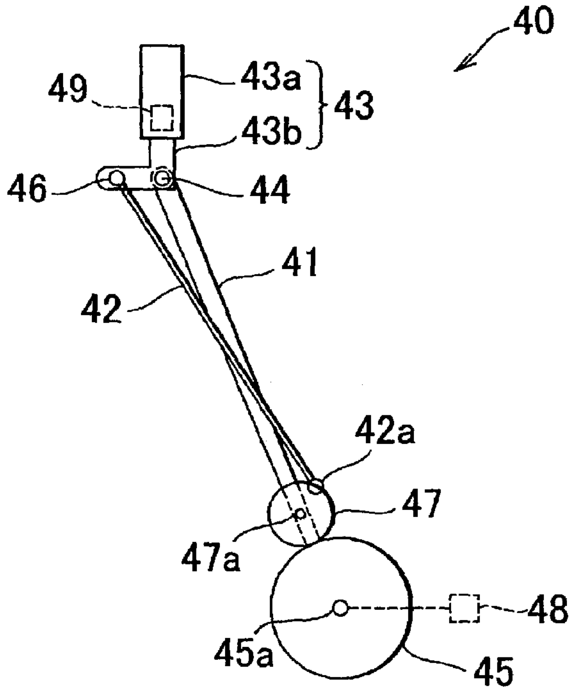
FIG. 6 is a schematic front view showing a state where the operating lever shown in FIG. 4 is further tilted.

FIGS. 4 to 6 show an operating lever 40 provided in the driving operation device according to a third embodiment of the invention. The operating lever 40 includes a main link 41 in a shape of a rod with a large-diameter, a control link 42 in a shape of a rod with a small-diameter, and a holding portion 43 including a rotational operation portion 43*a* in a cylindrical shape and a coupling portion 43*b* in an L-shape.

An upper end portion of the main link 41 is rotatably coupled with the holding portion 43 through a main rotational shaft 44 provided at a corner portion of the coupling portion 43*b*. A lower end portion of the main link 41 thereof is fixed to a central rotational shaft 45*a* which is rotatably mounted on a central portion of a gear 45 fixed to a vehicle body side. Therefore, the main link 41 rotates along with the central rotational shaft 45*a* centering around the central rotational shaft 45*a*. An upper end portion of the control link 42 is rotatably coupled with the holding portion 43 through a control rotational shaft 46 provided in an end of a portion extending sideward from a lower end of the coupling portion 43*b*. A lower end portion of the control link 42 is rotatably coupled with a periphery portion in an end face of an adjusting rotational shaft 47 which is provided with a small gear meshed with the gear 45.

Note that in the adjusting rotational shaft 47, a central shaft portion 47*a* is rotatably mounted on the main link 41. Also, a position of a coupling portion 42*a* by which a lower end portion of the control link 42 is coupled with the adjusting rotational shaft 47 is set so as to be at the same height as the central shaft portion 47*a* of the adjusting rotational shaft 47, when the main link 41 is at a neutral position (the state shown in FIG. 4) and the control link 42 is substantially parallel to the main link 41. Then, the control link 42 tilts along with the main link 41 in the lateral direction while moving the whole body up and down by a rotation of the adjusting rotational shaft 47 in accordance with a rotation of the central rotational shaft 45*a*.

Provided in the vicinity of the central rotational shaft 45*a* is an operation position sensor 48 for detecting a rotation angle of the central rotational shaft 45*a* as a displacement position of the operating lever 40 in the lateral direction. Also, the rotational operation portion 43*a* of the holding portion 43 is composed in the same manner as a rotational operation portion 13*a* of operating levers 10, 30 so as to be rotatable around a shaft (which extends in the longitudinal direction of portion 43*a*), and an operation position sensor 49 detects the rotation angle as a displacement position of the rotational operation portion 43*a*.

Due to such a construction, when the operating lever 40 is moved leftward from the state shown in FIG. 4 by operating the holding portion 43, the central rotational shaft 45*a* rotates with the operating lever 40 in the counterclockwise direction. The adjusting rotational shaft 47 rotates in the counterclockwise direction along a periphery of the gear 45 in accordance with a rotation of the central rotational shaft 45*a*. As a result, the coupling portion 42*a* by which the lower end portion of the control link 42 is coupled with the adjusting rotational shaft 47 moves down to a lower end position of the adjusting rotational shaft 47, and the control rotational shaft 46 also moves down in accordance with the coupling portion 42*a* as shown in FIG. 5. Then, the control rotational shaft 46 also moves down in accordance with the control link 42 to increase a tilt amount of the holding portion 43.

In addition, when the operating lever 40 is moved leftward, the central rotational shaft 45*a* rotates, which makes the adjusting rotational shaft 47 further rotate along the periphery of the gear 45 so that the coupling portion 42*a* moves from the lower end position to the upper end side of the adjusting rotational shaft 47, as shown in FIG. 6. This allows the control link 42 to move up along with the coupling portion 42*a* to act so as to push up the control rotational shaft 46 to suppress a tilt of the holding portion 43. As a result, the holding portion 43 comes close to the upright state.

In this manner, in the operating lever 40, the holding portion 43 tilts in a direction of increasing an amount of displacement in an early stage in which the operation of the operating lever 40 leftward from the neutral position is started. However, when the operating lever 40 is further operated leftward, the holding portion 43 tilts in a direction of suppressing an amount of displacement. This also occurs when the operating lever 40 is operated rightward. This enables an operation by a micro-input in the vicinity of the central position in which an amount of displacement of the operating lever 40 in the lateral direction is small, and facilitates an operation to rotate the rotational operation portion 43*a* when the amount of displacement of the operating lever 40 in the lateral direction increases, using the operating lever 40.

Figure 7:
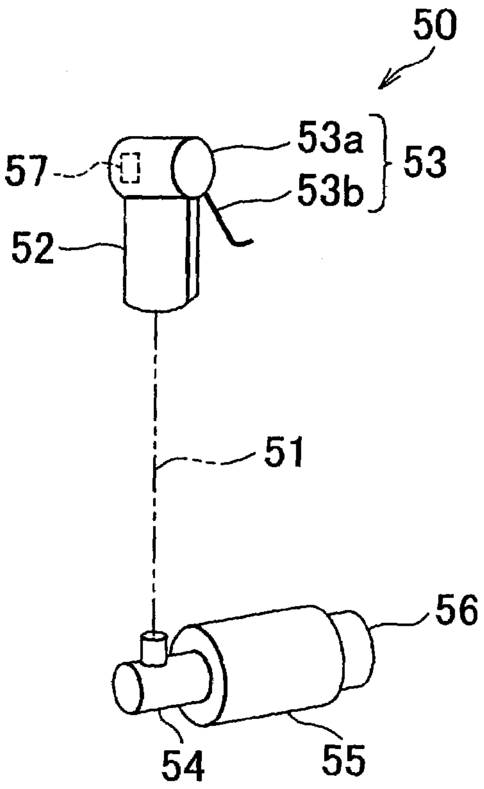
FIG. 7 is a schematic perspective view showing the operating lever of the driving operation device according to a fourth embodiment.

FIG. 7 shows an operating lever 50 provided in the driving operation device according to a fourth embodiment of the invention. The operating lever 50 includes a rod 51 in a round rod shape (shown by a chain triple-dashed line in the drawing), a holding portion 52 in a square pole shape which is mounted on an upper end of the rod 51, and a trigger operation portion 53 which is mounted on an upper end portion of the holding portion 52. A lower end portion of the rod 51 is fixed to a peripheral surface of a rotational shaft 54, which extends in a horizontal direction. Also, an electric motor 55 for generating a reaction force for returning the operating lever 50 to a neutral position is mounted on the rotational shaft 54, and an operation position sensor 56 for detecting a rotation angle of the rotational shaft 54 is provided in the vicinity of the end portion of the rotational shaft 54. The operation position sensor 56 detects a rotation angle of the rotational shaft 54 as an amount of displacement of the operating lever 50 in a longitudinal direction.

The trigger operation portion 53 is composed in a manner such that a rod-shaped trigger 53*b* protrudes obliquely downward from a peripheral surface of a cylindrical housing portion 53*a* whose central shaft extends horizontally. A rotational supporting shaft which is coupled with the trigger 53*b* and rotatably supports the trigger 53*b*, and a spring body for returning the trigger 53*b* to an initial position (this is set at a position which is apart from the holding portion 52 by a certain distance, and in which the driver can hold the holding portion 52 and the trigger 53*b* at the same time) (both of the rotational supporting shaft and the spring body are not shown) are provided inside the cylindrical housing portion 53*a*. Also, an operation position sensor 57 for detecting the rotation angle of the rotational supporting shaft as an amount of operation of the trigger 53*b* is provided inside the cylindrical housing portion 53*a*.

Figure 2:
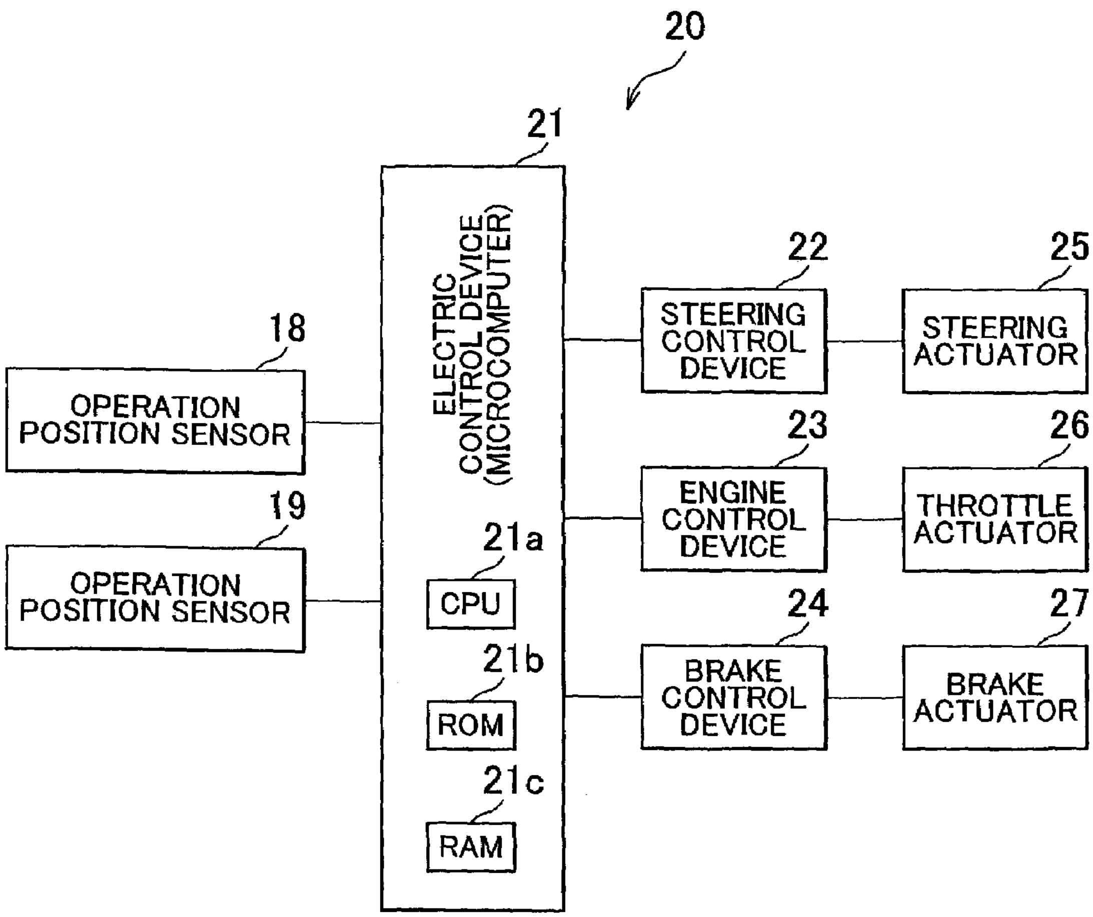
FIG. 2 is a block diagram showing an electric control device of the driving operation device according to each embodiment.

In this embodiment, although an electric control portion in the driving operation device has the same structure as the electric control device shown in FIG. 2, both of the values detected by the operation position sensors 56, 57 are used to control an engine control device 23. Namely, the operating lever 50 is operated in the longitudinal direction as a first input portion, and executes a master operation of an acceleration control. Then, the engine control device 23 drives a throttle actuator 26 based on an amount of operation of the operating lever 50, which is a first amount of operation detected by the operation position sensor 56 while being controlled by an electric control device 21.

In addition, the trigger operation portion 53 is grip-operated as a second input portion to execute a slave operation of the acceleration control. Then, the engine control device 23 is controlled by the electric control device 21 based on an amount of operation of the trigger 53*b*, which is a second amount of operation detected by the operation position sensor 57, and drives the throttle actuator 26. The vehicle performs an acceleration running by an output corresponding to a value detected by the operation position sensor 56, and further accelerates or decelerates the acceleration running by small amounts by an output corresponding to a value detected by the operation position sensor 57.

Figure 8:
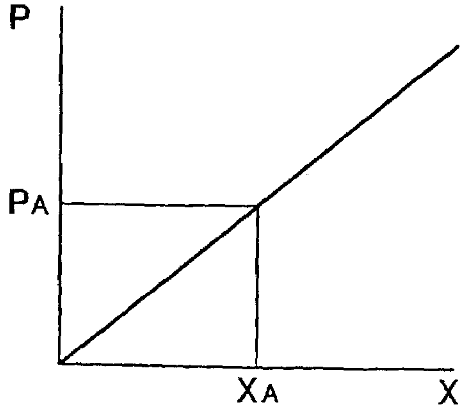
FIG. 8 is a graph showing a relation between an operating force on a vehicle applied by a master operation and a value detected by an operation position sensor.
Figure 9:
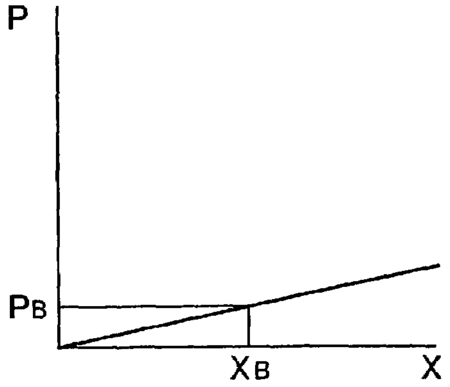
FIG. 9 is a graph showing a relation between the operating force on the vehicle applied by a slave operation and the value detected by the operation position sensor.

A relation between a value detected by the operation position sensor 56 and an output provided to the vehicle, and a relation between a value detected by the operation position sensor 57 and an output provided to the vehicle can be respectively input into a ROM 21*b* of the electric control device 21 as map data. For example, assuming that an output value P obtained when a value X detected by the operation position sensor 56 is XA is PA, a relation between the detected value XA and the output value PA is as shown in FIG. 8. Also, assuming that an output value P obtained when a value X detected by the operation position sensor 57 is XB is PB, a relation between the detected value XB and the output value PB is as shown in FIG. 9. Then, the output value P output to the engine control device 23 is a sum of or a difference between PA and PB. In this case, the output value P output to the vehicle may be a sum of or a difference between values obtained by multiplying the output value PA or the output value PB by a certain coefficient.

Also, a product of the output value PA and the output value PB may be an output value. In addition, a composite value having a certain relation with the output value PA and the output value PB may be the output value. As the composite value having a certain relation with the output value PA and the output value PB, a value, which is calculated by a mathematical formula that is set based on a detected value depending on an object, may be used. A calculation of the composite value or the like is executed by the electric control device 21, and determined based on the third amount of operation which is calculated in relation to the first amount of operation and the second amount of operation. Then, the electric control device 21 transmits the composite value to the engine control device 23 as a signal.

In this case, it may be preferable to lower a sensitivity of the output value PA which is based on an amount of operation of the operating lever 50 with respect to the output value PB which is based on an amount of operation of the trigger operation portion 53, or to lower a sensitivity of the operation position sensor 56 for detecting an amount of operation of the operating lever 50 with respect to the operation position sensor 57 for detecting an amount of operation of the trigger operation portion 53. The expression, "the sensitivity is low" means the output value PB corresponding to the trigger operation portion 53 is low compared with the output value PA corresponding to the operating lever 50, for example, when the operating lever 50 and the trigger operation portion 53 are operated by the same distance, as shown in FIGS. 8 and 9.

More specifically, this is attained by providing a map in which the output value PB corresponding to a trigger operation portion 53 becomes small compared with the output value PA corresponding to the operating lever 50, even when the detected values of amounts of operation are the same, when the operating lever 50 and the trigger operation portion 53 are operated by the same distance. Also, when the output values corresponding to the operating lever 50 and the trigger operation portion 53 have the same map, the output value PB corresponding to the trigger operation portion 53 may be small compared with the output value PA corresponding to the operating lever 50 by calculating the output value corresponding to the operating lever 50 and the trigger operation portion 53 first, and then multiplying one of the values by an output coefficient.

This enables an easy operation of the vehicle in various forms. In this manner, in the driving operation device including the operating lever 50, a regular acceleration control of the vehicle can be executed by operating the operating lever 50 in the longitudinal direction. In addition, a further acceleration control or a deceleration control of the acceleration control can be executed by an arbitrary small amount by operating the trigger operation portion 53. This brings about increased flexibility in the operation of the vehicle.

In the aforementioned example, the operation of the operating lever 50 and the operation of the trigger operation portion 53 are operations for executing acceleration control. However, a steering of the vehicle can be executed as well. In this case, it is preferable that an operation direction of the operating lever 50 is the lateral direction. Also, a braking control of the vehicle, or both the acceleration control and braking control can be executed by the operation of the operating lever 50 and the operation of the trigger operation portion 53. When both acceleration control and braking control are executed, an operation range of the operating lever 50 is categorized by assigning a front side with respect to the neutral position of the operating lever 50 as a portion for executing the braking control, and a rear side as a portion for executing an acceleration control or vice versa. In such a case, it is preferable to regard the operation of the operating lever 50 in the longitudinal direction or the lateral direction as a master operation, and the operation of the trigger operation portion 53 as a slave operation.

Figure 10:
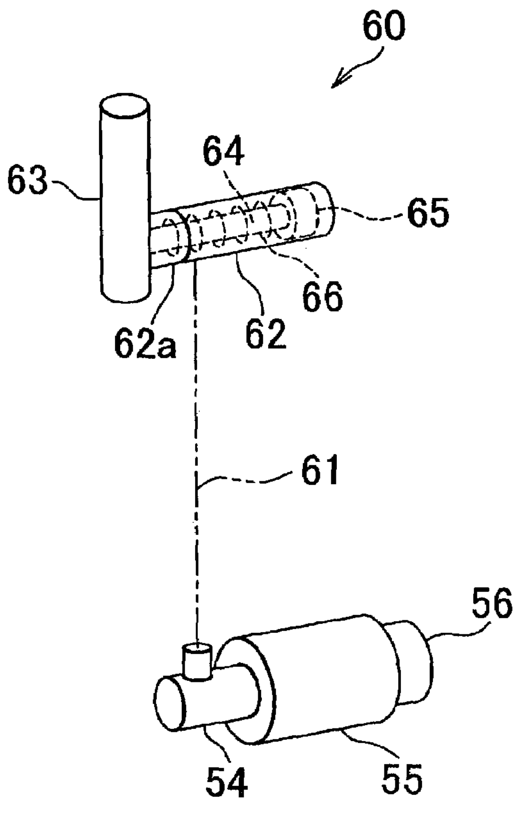
FIG. 10 is a schematic perspective view showing the operating lever of the driving operation device according to a fifth embodiment.

FIG. 10 shows an operating lever 60 provided in the driving operation device according to a fifth embodiment of the invention. In the operating lever 60, a cylindrical level holding portion 62 as a first input portion extends in a horizontal direction, and is fixed to an upper end of a rod-shaped rod 61 which is disposed in a vertical direction. Also, a short-cylindrical rotational portion 62*a*, which is rotatable about a shaft with respect to the level holding portion 62, is mounted on one end of the level holding portion 62. A cylindrical vertical holding portion 63 as a second input portion extends in the vertical direction, and is fixed to one end of the rotational portion 62*a*. Also, a rotational shaft 64 coupled with the vertical holding portion 63 is provided inside the level holding portion 62 and the rotational portion 62*a*, and an operation position sensor 65 for detecting a rotation angle of the rotational shaft 64 is provided on the other end of the rotational shaft 64. The operation position sensor 65 detects the rotation angle of the rotational shaft 64 as an amount of operation of the vertical holding portion 63 in a longitudinal direction (of the vehicle).

Also, a spring body 66 for returning the vertical holding portion 63 to an initial position (a neutral position with respect to the rod 61) is provided on a peripheral portion of the rotational shaft 64. Structures of the other portions in the driving operation device including the operating lever 60 are the same as those of the driving operation device including an operating lever 50 according to the fourth embodiment. Therefore, the same symbols are assigned to the same portions in the drawing.

In the driving operation device including the operating lever 60, an operation of holding the level holding portion 62 and reciprocating the whole lever 60 in the longitudinal direction is a master operation, and an amount of operation thereof is a first amount of operation. An operation of holding the vertical holding portion 63 and tilting the vertical holding portion 63 in the longitudinal direction with respect to the rod 61 is a slave operation, and an amount of operation thereof is a second amount of operation. Then, a third amount of operation is calculated from the first amount of operation and the second amount of operation. This facilitates the operation, since the master operation and the slave operation can be executed by putting a driver's palm on the level holding portion 62 of the operating lever 60 to hold the vertical holding portion 63, and operating both of the level holding portion 62 and the vertical holding portion 63 in the longitudinal direction. The other actions and effects are the same as those of the driving operation device including the operating lever 50 according to the fourth embodiment.

As a modified example of an operating lever 60, a direction of operating a level holding portion 62 may be different from a direction of operating a vertical holding portion 63 by setting the level holding portion 62 in a direction orthogonal to the rotational shaft 54. Also, a slave operation may be executed by rotating a rotational operation portion 13*a* about a shaft using a holding portion 13 or a holding portion 34 which include the rotational operation portion 13*a*, and an operation position sensor 19 according to the first embodiment instead of using the level holding portion 62, a rotational portion 62*a*, the vertical holding portion 63, a rotational shaft 64, an operation position sensor 65, and a spring body 66.

In this case, the holding portions 13, 34 are first input portions, and the rotational operation portion 13*a* is a second input portion. Also, the amounts of operation of the holding portions 13, 34 are a first amount of operation, and an amount of operation of the rotational operation portion 13*a* is a second amount of operation. In the same manner, in an operating lever 50, the holding portion 13 or the holding portion 34 which includes the rotational operation portion 13*a* and the operation position sensor 19 can be used instead of a holding portion 52, a trigger operation portion 53, and an operation position sensor 57.

Figure 11:
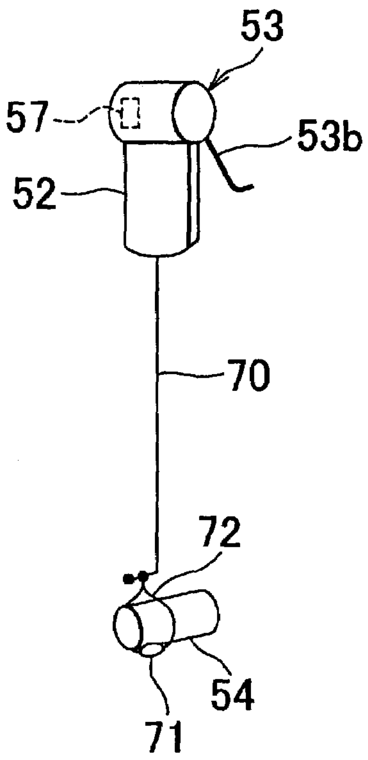
FIG. 11 is a schematic perspective view showing a brake mechanism according to a modified example of the operating lever shown in FIG. 7.

In addition, as a modified example common to the operating levers 50, 60, a brake mechanism for regulating movements of the operating levers 50, 60 may be provided to the trigger operation portion 53 or the rotational shaft 64 which execute the slave operation. As such a mechanism, for example, as shown in FIG. 11, a mechanism in which a trigger 53*b* of the trigger operation portion 53 is coupled with an upper end of a wire 70, a fastening ring 72 including a friction pad 71 is coupled with a lower end of the wire 70, and the ring 72 is wound around the periphery of the rotational shaft 54 may be used.

Using this mechanism, when the holding portion 52 and the trigger 53*b* are gripped together to move the trigger 53*b* to the holding portion 52 side, the friction pad 71 is pressed against the periphery of the rotational shaft 54 because the wire 70 pulls on the ring 72. As a result, the rotational shaft 54 is prevented from rotating in accordance with the frictional force with the friction pad 71, and the operating lever 50 is braked along with the rotational shaft 54. Also, when the trigger 53*b* is released, pressing of the rotational shaft 54 by the frictional pad 71 is released, which makes it easy to move the rotational shaft 54 and the operating lever 50.

Figure 12:
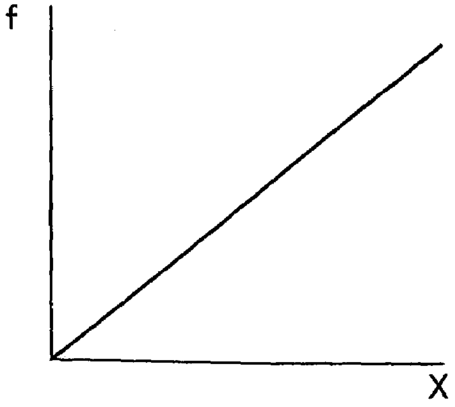
FIG. 12 is a graph showing a relation between a frictional force of the brake mechanism and a value detected by the operation position sensor.

In this case, a frictional force f between the rotational shaft 54 and the frictional pad 71 is set so as to be proportional to an amount of operation X of the trigger 53*b* which is detected by the operation position sensor 57, as shown in FIG. 12. This enables an output to the vehicle to be an output close to a target by the master operation of operating the operating lever 50, and the output to the vehicle to reach a target output while supplying a braking force to the operating lever 50 by the slave operation of operating the trigger 53*b*, when the output provided to the vehicle comes close to the target output. This prevents shaking or vibrating or the like in the operation lever 50, which stabilizes the vehicle operation.

This brake mechanism can be used for the operating lever 60 according to the fifth embodiment as well. In this case, the friction pad 71 is pressed against the rotational shaft 54 by tilt-operating the vertical holding portion 63 toward a rod 61. Also, a motor instead of the wire 70 can be used for this brake mechanism. In this case, a mechanism in which the motor pulls on the ring 72 based on values detected by the operation position sensors 57, 65 is employed. This brings about the same effect.

Note that an amount of operation may be not only an amount of displacement but also an operating force in the driving operation device according to the fourth and fifth embodiments and the modified example thereof. In this case, a pressure sensor is used as a sensor. Also, in the fourth and fifth embodiments and the modified example thereof, a third amount of operation is electrically determined by associating a first amount of operation by operating the operating levers 50, 60 with a second amount of operation by operating the trigger operation portion 53 and the vertical holding portion 63, and the output value is calculated based on the third amount of operation. However, this output value can be calculated mechanically, for example, combining the amounts of operation from the two input portions to output it or the like, using a differential mechanism of a planet gear or the like. In this case, an amount of operation of the output side, which is the third amount of operation, is detected by the sensor, and the detected value is transmitted to an electric control device 21 as a signal.

Also, as the operation member used for the driving operation device according to the invention, not only a joystick but also a steering wheel can be used. In addition, an operating member composed only of the right and left portions of the steering wheel while upper and lower portions thereof being removed may be used for operating the vehicle. Also, the meaning of the expression "the sensitivity is low" according to the invention includes that the sensitivity of the output value of the main link 11 corresponding to the output of the operating lever 10 has consequently reduced, in a case where the invention includes a mechanism by which a main link 11 (the second input portion) is operated on a small scale even if the holding portion 13 is operated on a large scale by opening an operating lever 10 (the first input portion).

While the invention has been described with reference to preferred exemplary embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more or less or only a single element, are also within the spirit and scope of the invention.

What is claimed is:

1. A driving operation device that executes a driving operation of a vehicle by a driver comprising:

a first input portion by which the driver inputs a first amount of operation;

a second input portion which is independent from the first input portion and by which the driver inputs a second amount of operation; and a single output portion which outputs a third output value which is determined according to a first output value based on the first amount of operation and a second output value based on the second amount of operation, wherein the first amount of operation and the second amount of operation control a single driving operation.

2. The driving operation device according to claim 1, further comprising:

an operation portion comprising the first input portion and the second input portion.

3. The driving operation device according to claim 1, wherein the first output value has a greater effect than the second output value on the third output value.

4. The driving operation device according to claim 2, wherein:

the operation portion is a holding portion of the driving operation device, and further comprises a rod-shaped portion coupled to the first and second input portions, and a rotational output portion that produces an output and is coupled to the rod-shaped portion; and at least one of the first amount of operation and the second amount of operation is transmitted from the operation portion to the rotational output portion.

5. The driving operation device according to claim 4, wherein:

the first output value is a tilt angle of the operation portion relative to an initial position based on the first amount of operation.

6. The driving operation device according to claim 4, wherein:

the second input portion is a trigger member protruding from the holding portion of the operation portion, and can be operated by a finger of the vehicle driver.

7. A driving operation device that executes a driving operation of a vehicle by a driver, comprising:

an input portion that is operated by the driver;

an output portion that is connected to the input portion whereby movement of the input portion in a radial plane of the output portion drives the output portion, wherein a position of the input portion relative to a position of the output portion changes as the input portion is operated by the driver; and a transmitting mechanism that changes a ratio of a driven amount of the output portion to an operated amount of the input portion according to the position of the input portion relative to the position of the output portion.

8. The driving operation device according to claim 7, wherein the transmitting mechanism is adapted to increase the ratio of the driven amount of the output portion to the operated amount of the input portion as the position of the input portion moves away from an initial position of the input portion and decrease the same ratio as the position of the input portion approaches the initial position.

9. The driving operation device according to claim 7, wherein the transmitting mechanism includes a link mechanism including a first link and a second link and the input portion and the output portion are connected via the first link and the second link.

10. The driving operation device according to claim 9, wherein the first link and the second link are different in length.

11. The driving operation device according to claim 9, wherein the first link and the second link are connected to the input portion and the output portion so that an orientation of the input portion changes relatively to the link mechanism in accordance with a change of the operated amount of the input portion.

12. The driving operation device according to claim 9, wherein the first amount of operation and the second amount of operation may occur simultaneously, sequentially or with some overlap.

* * * * *